United States Patent [19]  
Osanai

[11] 4,236,681  
[45] Dec. 2, 1980

[54] TAPE RECORDER
[75] Inventor: Akira Osanai, Hachioji, Japan
[73] Assignee: Olympus Optical Co., Ltd., Tokyo, Japan
[21] Appl. No.: 57,320
[22] Filed: Jul. 13, 1979
[30] Foreign Application Priority Data Jul. 31, 1978 [JP] Japan .................. 53-93309

[51] Int. Cl.³ .................. G03B 1/04; G11B 15/32
[52] U.S. Cl. .................................. 242/198
[58] Field of Search .............. 242/197, 198; 360/69, 360/93, 96, 13 Z, 137

[56] References Cited  
U.S. PATENT DOCUMENTS 3,924,823  12/1975  Cohen et al. .............. 242/198
4,021,005   5/1977  Takemoto et al. .......... 242/198
4,050,087   9/1977  Kishi .................... 360/96

FOREIGN PATENT DOCUMENTS 47-49011  12/1972  Japan ..................... 242/198

Primary Examiner—Leonard D. Christian

[57] ABSTRACT

Disclosed is a tape recorder in which a sound reproducing/recording state is set up by raising a movable chassis carrying a capstan and a pair of reel shafts. A motor is disposed on a fixed chassis. In a stop state of the tape recorder where the movable chassis is in a lowered position, a flywheel fixed to the capstan is located at a distance from a motor pulley fixed to the output shaft of the motor. When the movable chassis is raised to set up the sound reproducing/recording state, the flywheel is pressed against the motor pully to be connected directly with the motor.

3 Claims, 2 Drawing Figures

TAPE RECORDER

BACKGROUND OF THE INVENTION

This invention relates to a tape recorder, more particularly to a tape recorder which is set to a sound reproducing/recording state when a movable chassis carrying a capstan and a reel shaft is raised.

Widely used for conventional tape recorders, such as cassette-type car stereo sets, are constructions represented by what is called a Staar system, in which a movable chassis is raised and a capstan and a pair of reel shafts are inserted into reel shaft holes bored on a cassette by setting the cassette in place. According to one such conventional construction, both a motor and the capstan are mounted on the movable chassis, and an endless belt is stretched between a motor pulley and a capstan wheel for the transmission of a turning force. In this construction, however, the motor pulley and the capstan wheel adversely rotate in the same direction, so that rolling of the tape recorder may cause irregular rotations. Recently, there has been provided a tape recorder employing an automatic reverse for a dual capstan system, in which two flywheels are rotated in opposite directions to produce an anti-rolling effect. Although these flywheels may possess an anti-rolling effect since they are so designed as to have substantially equal moments of inertia, there is taken no measure to counter the rolling of the motor. Thus, it is impossible to obtain a satisfactory anti-rolling effect. Further, in the prior art constructions represented by the Staar system raising an lowering the movable chassis, the motor as well as the capstan and the reel shaft are disposed on the movable chassis. The motor is so heavy that the movable chassis requires a great amount of power to operate.

The inventor hereof has proposed an anti-rolling mechanism in which the flywheel and the motor pulley are directly coupled to rotate in opposite directions, with the moment of inertia $I_F$ of the flywheel given as follows:

$$I_F = I_M \cdot n = I_M \cdot (\omega_M / \omega_F).$$

here
$I_M$: moment of inertia of motor,
$\omega_M$: angular velocity of motor,
$\omega_F$: angular velocity of flywheel,
n: ratio of rotation.

Although capable of giving a satisfactory anti-rolling effect, this mechanism is supposed to be susceptible to irregular rotations due to deformation of a rubber tire around the outer periphery of the flywheel, which may be caused after a prolonged stay in a stop state, because the flywheel is always pressed against the motor.

SUMMARY OF THE INVENTION

It is therefore an object of this invention to provide a tape recorder free from the above-mentioned drawbacks of the prior art constructions.

In order to attain the above object, the tape recorder according to this invention is so constructed that a motor is disposed on a fixed chassis, a motor pulley and a flywheel on a movable chassis are separated from each other in a stop state of the tape recorder, and the flywheel is pressed against the motor pulley to be connected directly with the motor in a sound reproducing/recording state when the movable chassis is raised.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF THE PREFERRED EMBODIMENT

Figure 1:
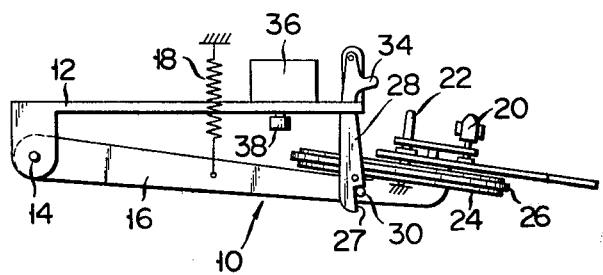
FIGS. 1 and 2 are schematic side views of the principal part of a tape recorder according to one preferred embodiment of this invention, in which a movable chassis is lowered and raised, respectively.
Figure 2:
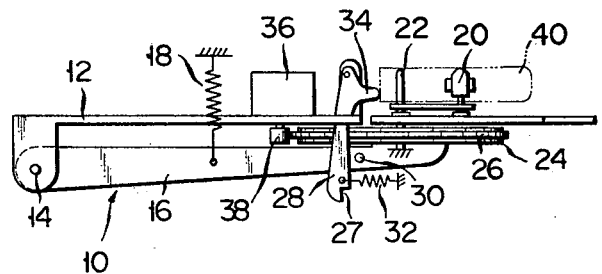

As may be seen from the drawing of FIGS. 1 and 2, a movable chassis 16 is swingably attached to a fixed chassis 12 of a tape recorder 10 by means of a pin 14. The movable chassis 16 is biased toward the fixed chassis 12 or upward by a tension spring 18. A pair of reel shafts 20 (only one shaft is shown in the drawing since one shaft is disposed behind the other in the FIGS. 1 and 2. and a capstan 22 are mounted on the movable chassis 16. The capstan 22 is fitted at its bottom end with a flywheel 24 having a rubber tire 26 wound round the outer periphery thereof.

Further, a hook 28 with a notch 27 is swingably attached to the fixed chassis 12, while an engaging pin 30 protrudes from a side of the movable chassis 16. The hook 28 is biased toward the engaging pin 30 by means of a tension spring 32 (FIG. 2), and the movable chassis 16, as seen from FIG. 1, is maintained at a lowered position with the pin 30 engaging the notch 27 while the tape recorder 10 is stopped. The hook 28 is further provided with an engagement release knob 34 on the same side as the notch 27. Moreover, a motor 36 is mounted on the fixed chassis 12. In a stop state of the tape recorder 10, therefore, the flywheel 24 on the movable chassis 16 is located at a distance from a motor pulley 38 on the fixed chassis 12, so that the rubber tire 26 on the flywheel 24 may fully be prevented from being deformed. Since the motor 36 is disposed not on the movable chassis 16 but on the fixed chassis 12, the operating power for the movable chassis 16 may be reduced. Also, the setting of the motor 36 on the fixed chassis 12 is desirable from a point of view of prevention of vibration, minimizing the influence of rolling.

The movable chassis 16 may be raised by pressing the engagement release knob 34 with a compact cassette, namely a tape cassette 40 set in place. That is, when the engaging pin 30 is released from the notch 27 by pressing the knob 34 against the bias force of the tension spring 32, the movable chassis 16 is swung round the rotating pin 14 and moves up. When the movable chassis 16 is raised, the flywheel 24 is coupled directly with the motor 36 through the rubber tire 26, and the turning force of the motor 36 is transmitted to the capstan 22. In this state for sound recording and sound reproducing, the motor pulley 38 and the flywheel 24 are directly connected without employing a rubber belt or the like and are rotated in opposite directions, thereby providing an anti-rolling effect. The stop state of the tape recorder after sound reproducing and/or recording may be set by removing the tape cassette 40 and forcing down the movable chassis 16 to engage the engaging pin 30 with the notch 27.

According to this invention, as described above, the motor 36 is disposed on the fixed chassis 12, and the flywheel 24 on the movable chassis 16 is separated from the motor pulley 38 on the fixed chassis 12 in the stop state when the movable chassis 16 is in the lowered position. When the movable chassis 16 is raised to be set to the sound reproducing/recording state, the flywheel 24 is pressed against the motor pulley 38 for direct coupling. Accordingly, even if the tape recorder is left in the stop state for a prolonged period, the rubber tire 26 on the flywheel 24 subjected is not to any pressing force, will not be deformed. Further and the motor 36 and the flywheel 24 are connected directly with each other to rotate in opposite directions, so that there may be obtained the anti-rolling effect. Since the motor 36 is disposed on the fixed chassis 12, moreover, the operating power for the movable chassis 16 is reduced, and the resultant construction becomes more resistant to vibration.

What is claimed is:

1. A tape recorder comprising a movable chassis, a capstan and a flywheel fixed to said capstan carried by said movable chassis, said movable chassis being movable between a raised and a lowered position and when in said raised position setting up a sound reproducing-/recording state, a fixed chassis, a motor having an output shaft disposed on said fixed chassis, and a motor pulley fixed to said output shaft, said flywheel being at a distance from said motor pulley when said movable chassis is in said lowered position in which it is in a stop state, and said flywheel being pressed against said motor pulley to be connected directly with said motor when said movable chassis is raised to set up the sound reproducing/recording state, whereby the motor will generate a driving torque for the capstan.

2. A tape recorder according to claim 1, wherein there is provided a first bias means for subjecting said movable chassis to an upward bias force, an engaging pin attached to a side of said movable chassis, a hook swingably attached to said fixed chassis and having a notch and an engagement release knob formed on the same side of said hook, and a second bias means for biassing said hook in a direction to engage said pin with said notch, said pin remaining in engagement with said notch until said release knob is pushed by a cassette.

3. A tape recorder according to claim 2, wherein said first and second bias means are tension springs.

* * * * *